United States Patent [19]

Frost et al.

[11] 4,228,568
[45] Oct. 21, 1980

[54] RELEASABLE FASTENER FOR AIRCRAFT EJECTION SEATS

[75] Inventors: Richard H. Frost, Littleton; Charles W. Dodge, Golden, both of Colo.

[73] Assignee: Frost Engineering Development Corp., Englewood, Colo.

[21] Appl. No.: 959,769

[22] Filed: Nov. 13, 1978

[51] Int. Cl.² ............................................. A44B 19/00
[52] U.S. Cl. .............................. 24/230 R; 24/205.17; 24/208 R; 244/151 R
[58] Field of Search ...................... 24/205.17, 230 R, 24/205.19, 205.18, 24/208 R; 244/151 A, 151 B, 151 R

[56] References Cited

U.S. PATENT DOCUMENTS

| 495,633 | 4/1893 | Hoyt | 24/265 R |
|---|---|---|---|
| 2,763,451 | 9/1956 | Moran | 24/208 R X |
| 2,999,288 | 9/1961 | Warner | 24/230 A |
| 3,343,228 | 9/1967 | Close | 24/230 A |
| 3,555,628 | 1/1971 | Brown | 24/205.17 |
| 3,605,209 | 9/1971 | Alarcon | 24/230 A |
| 3,710,426 | 1/1973 | Gavagan | 24/230 R X |
| 3,865,333 | 2/1975 | Fielding | 244/151 B |
| 3,872,556 | 3/1975 | Frost | 244/151 B X |
| 3,884,436 | 5/1975 | Poehlmann | 24/205.17 X |
| 3,986,234 | 10/1976 | Frost | 24/230 AT |

*Primary Examiner*—Nile C. Byers, Jr.
*Attorney, Agent, or Firm*—Ralph F. Crandell

[57] ABSTRACT

A releasable fastener for securing together lap belt straps, shoulder harness straps and a parachute ripcord lanyard. The fastener includes a buckle member or release assembly on one lap belt interengageable with a tongue member or link assembly on the other lap belt. A key on the end of the ripcord lanyard is releasably attached to the link assembly. The shoulder harness straps are engaged with the release assembly before it is coupled with the link assembly. The fastener provides for automatic release of the lap belt and shoulder harness straps to release the user from an aircraft ejection seat after its ejection from the aircraft, while retaining the parachute ripcord in attachment to the ejection seat for initiating automatic deployment of the parachute. Upon manual release of the fastener, the lap belt and shoulder harness straps are released and the ripcord lanyard key is positively ejected from the fastener to ensure its release.

13 Claims, 13 Drawing Figures

RELEASABLE FASTENER FOR AIRCRAFT EJECTION SEATS

The invention described herein was made in the course of or under contract, or subcontract thereunder, with the U. S. Department of Defense.

BACKGROUND OF THE INVENTION

1. Field of Invention

The present invention relates to releasable fasteners for releasably securing straps, webbing or belts together. More particularly, the invention relates to releasable fasteners for use with aircraft ejection seats for securing lap belts, torso restraint or shoulder harness straps and a parachute ripcord, or ripcord lanyard, in an arrangement facilitating both manual release of the connected members and quick disconnect emergency release of the lap belts and torso or shoulder straps in connection with operation of the ejection seat and subsequent automatic opening of the parachute.

2. Description of the Prior Art

Releasable fasteners for securing belts, straps, webbing and the like together, and particularly for use in coupling the lap belts and shoulder straps of an aircraft ejection seat are well known in the art. The present invention includes as a portion thereof certain features of the releasable fastener shown in U.S. Pat. No. 3,986,234, issued Oct. 19, 1976 to Richard H. Frost, et al., for the "Releasable Fastener". The disclosure in U.S. Pat. No. 3,986,234, is incorporated herein by this reference.

The prior art has made provision for coupling a ripcord to the ejection seat to effect automatic deployment of the parachute in the event of an emergency ejection of the seat and crewman from the aircraft. See, for example, U.S. Pat. No. 2,763,451, issued Sept. 18, 1956, to J. P. Moran, for "Apparatus for Releasing an Aviator From a Safety Harness Connection with a Seat." The parachute ripcord conventionally terminates in a D-ring handle which the wearer may grasp and pull to deploy the parachute. For automatic deployment of the parachute following seat ejection, a lanyard may be secured at one end to the D-ring and at its other end is provided with a key or terminal, sometimes referred to as a "gold key" by virtue of its color, which is adapted for engagement with the ejection seat either directly or through the lap belts. In some installations, particularly for high speed, high altitude aircraft, lanyard is secured at its first end to an automatic parachute opener which includes both altitude sensing features and a time delay mechanism to allow the ejection seat and crewman to descend to a safer lower altitude before the parachute is opened.

In order to provide for automatic disconnections of the lap belts and shoulder straps, to allow the ejection seat to separate from the crewman before the parachute is deployed, the present invention further includes a quick disconnect coupling mechanism, embodying certain features of the character shown in U.S. Pat. No. 3,872,556, issued May 25, 1975, to Richard H. Frost for "Gas Operated Quick Disconnect Coupling." The disclosure in U.S. Pat. No. 3,872,556 is incorporated herein by this reference.

OBJECTS OF THE INVENTION

It is the principal object of the present invention to provide an improved releasable fastener for the lap belts and shoulder straps of an aircraft ejection seat, which fastener further interlocks with and is releasably coupled with the parachute ripcord or deployment mechanism.

Another object of the present invention is to provide an improved releasable fastener of the foregoing character which is light weight, yet rugged and compact, and is adaptable for field installation in existing aircraft ejection seat systems.

Still another object of the present invention is to provide a releasable seat belt fastener of the above character which interlocks with the parachute ripcord or its lanyard terminal or key in a manner that requires that the ripcord be engaged with the fastener in order to effect buckling engagement of the seat belts and shoulder straps.

A further object of the present invention is to provide a releasable fastener of the above type in which the ripcord terminal or key is engaged with and held in a fastener component as a first step in coupling the fastener members, but which can be released from the fastener component without requiring actuation of either fastener component, so that the crewman can escape from the aircraft in the event of an emergency during the initial preparatory stages of coupling his harness and gear to the craft.

Still another object of the present invention is to provide for the automatic disengagement of the seat belt and shoulder harness straps in connection with operation of the aircraft ejection seat system, while retaining the ripcord in engagement with the fastener and thereby the ejection seat to provide for subsequent automatic deployment of the parachute following ejection.

Still a further object of the invention is to provide an improved mechanism for adjustably securing the lap belt straps to the fastener sections or members.

Other and further objects of the present invention will be apparent from the following description of the invention taken in conjunction with the accompanying drawings.

SUMMARY OF THE INVENTION

In accordance with the foregoing objects, the present invention is embodied in a releasable fastener composed of a buckle member or release assembly and a tongue member or link assembly which are interengageable, and which may be manually separated or separated by a powered quick disconnect mechanism. The fastener finds particular utility in conjunction with an aircraft ejection seat for connecting a pair of lap belts, torso restraint or shoulder harness straps and a parachute ripcord. The buckle member is secured to one lap belt by a webbing length adjustment device and the tongue member is connected to the other lap belt by a similar adjustment mechanism. For convenience, reference to a parachute ripcord means or includes a lanyard as well as automatic deployment mechanisms.

Upon entering an aircraft equipped with a fastener embodying this invention, the crewman first engages a terminal or key on the end of the ripcord with the link assembly, by inserting the key into an interlock device on the link assembly. Unless and until this is done, the release assembly and link assembly cannot be locked together. After inserting the ripcord key, which is releasably held by the interlock, loops on the ends of the shoulder straps are engaged with a bar projecting in parallel relation from the release assembly, and the release and link assemblies are then engaged. For the coupling operation, a latch and slide on the buckle member or release assembly must be activated while the tongue member or link assembly is inserted. As these members are coupled, the shoulder strap bar is automatically inserted in a mating aperture in the link assembly adjacent the ripcord key interlock in order to lock the key in place so that it cannot thereafter be pulled out of the coupled fastener.

In the event the fastener is manually released, by actuating the latch and slide on the release assembly, the lap belts can be separated and the shoulder straps can slide off of the strap bar. Simultaneously, the ripcord key is automatically ejected from the interlock on the link assembly to release the ripcord. Should the quick disconnect mechanism on the link assembly be actuated, as would be the case following ejection of the seat from the aircraft, the ripcord key remains locked in the interlock and thereby secured to the seat belt so that the crewman's parachute is automatically deployed as he is separated from his ejection seat.

The ripcord key interlock mechanism utilizes a four pronged bell crank with an over-center toggle mechanism. The bell crank incorporates a hook for engaging the ripcord key, and a stop arm for precluding full entry of the shoulder strap bar when the ripcord key is not engaged so that the release and link assemblies cannot be coupled. The stop arm further engages an inserted end of the shoulder strap bar to prevent withdrawal of the ripcord key when the fastener elements are coupled. A lock arm on the bell crank engages a pin or projection on the quick disconnect mechanism when there is a powered disconnect to prevent withdrawal of the ripcord key under such circumstances.

The seat belt adjustment mechanism embodies a spring biased, sliding, knurled bar which coacts with a stationary cross-arm to adjustably retain a fastener member or assembly on a belt or webbing.

DESCRIPTION OF THE PREFERRED EMBODIMENT

Figure 1:
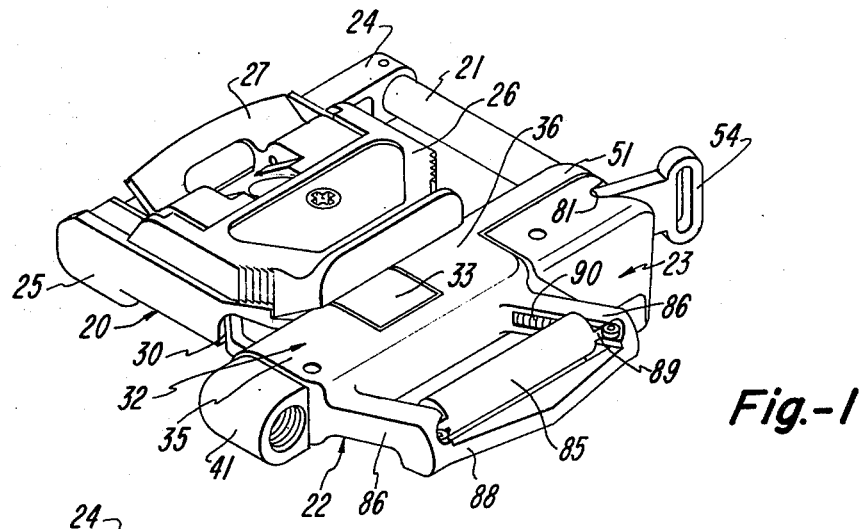
FIG. 1 is a top perspective view of a releasable fastener embodying the present invention including a buckle or release assembly with a shoulder harness bar, a power-releasable assembly with a ripcord key interlock having a ripcord key inserted therein, and a spring loaded strap or webbing adjustment bar in each assembly.
Figure 2:
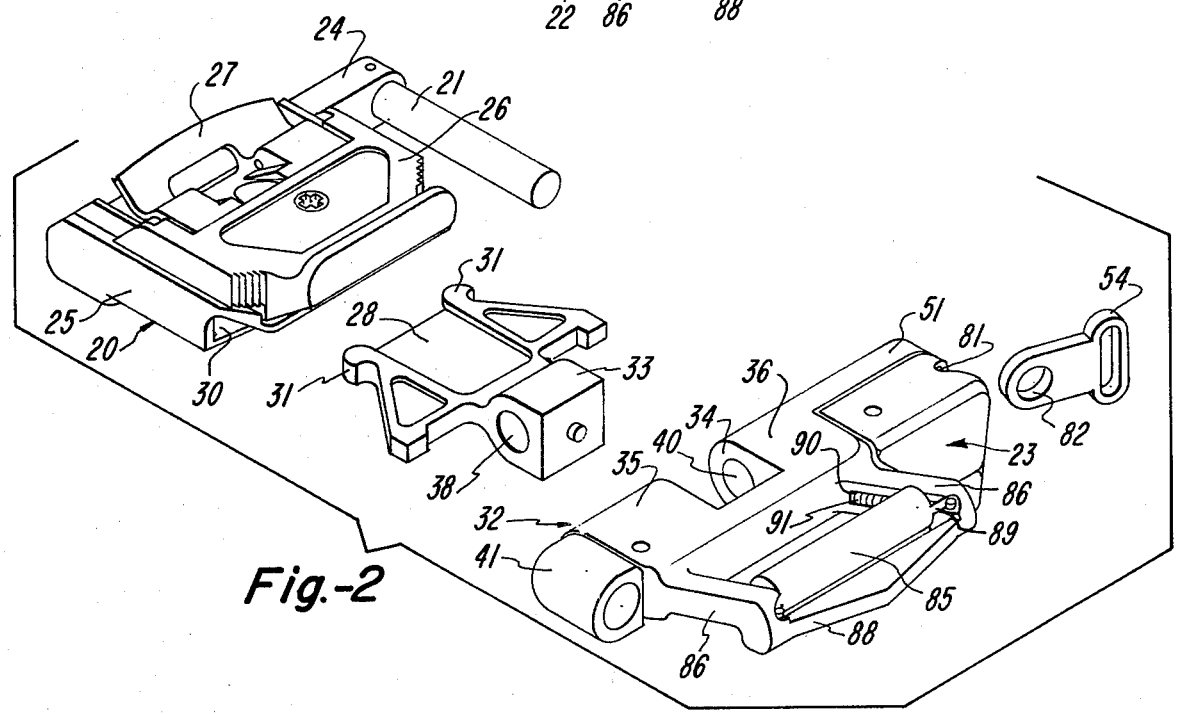
FIG. 2 is an exploded perspective view of the releasable fastener shown in FIG. 1.
Figure 3:
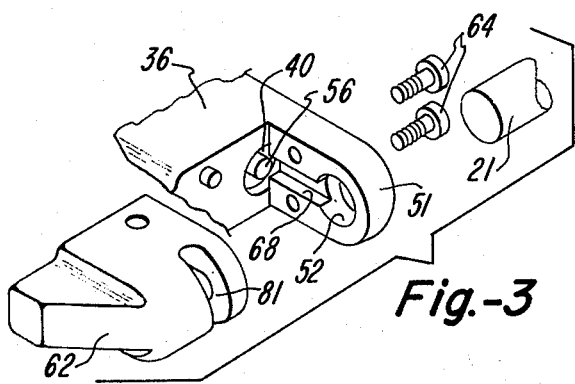
FIG. 3 is a partial exploded perspective view of the ripcord key retainer assembly forming a part of the fastener shown in FIG. 1.
Figure 4:
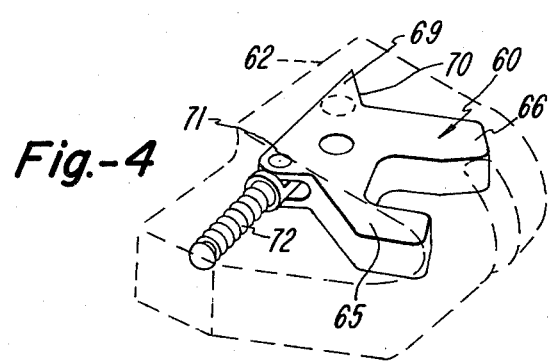
FIG. 4 is a perspective view of the bell crank and spring toggle mechanism forming a part of the ripcord key interlock embodied in the present invention.

The releasable fastener embodying the present invention, with its associated torso restraint or shoulder harness strap bar, quick disconnect capability, and ripcord key interlock, is formed by a buckle member or release assembly 20, which includes a shoulder harness or torso restraint strap bar 21, and a link assembly or tongue member 22, which includes a parachute ripcord key interlock mechanism 23 and quick disconnect mechanism 32.

The release assembly or buckle member 20 incorporates many of the features of the release assembly described in U.S. Pat. No. 3,986,234, issued Oct. 19, 1976, to Richard H. Frost and Ronald L. Criley, previously incorporated herein by reference. The description and use of the release assembly 20 is basically the same as described in the previous patent to which reference should be made for a more detailed description thereof. In addition, the release assembly 20 has mounted to it a shoulder strap or harness bar 21 extending in spaced parallel relation to the release assembly 20 at one side thereof. The shoulder strap bar 21 is supported at one side of the release assembly 20 by a mounting arm 24 extending laterally from the rear or belt end of the assembly 20. As described in the above patent, the release assembly 20 is formed by a body 25, which incorporates a latching mechanism which includes an actuating slide 26 for opening and closing the latching mechanism, and a latch 27 for locking the slide 26 against undesired movement.

The link assembly or tongue member 22 includes a tongue or latch plate 28 adapted to be inserted into a slot 30 in the release assembly 20, wherein lock pins (not shown) contained within the release assembly 20 are engaged by a pair of spaced apart strike lugs 31 on the tongue 28 in a manner as described in the above patent. Once so engaged, the releasable fastening aspects of the present invention are essentially as described in U.S. Pat. No. 3,986,234.

The link assembly 22 incorporates a quick disconnect coupling mechanism 32, which is automatically actuated under selected conditions. One form of quick disconnect coupling mechanism, as shown in the drawings, is of the character described in U.S. Pat. No. 3,872,556, issued May 25, 1975 to Richard H. Frost for "Gas Operated Quick Disconnect Coupling". To the extent necessary for a complete disclosure and thorough understanding of the disconnect mechanism and its uses, reference should be made to U.S. Pat. No. 3,872,556, the disclosure of which is incorporated herein by the above reference. As described in U.S. Pat. No. 3,872,556, the disconnect coupling is gas powered through a gas conduit 37 connected to an actuating mechanism (not shown) on the ejection seat. The disconnect mechanism 32 is sometimes referred to for convenience as a shuttle trunnion disconnect mechanism.

For purposes of providing the quick disconnect feature, an insert or tongue block 33 opposite the strike or tongue 28, is generally cubic in shape and is adapted to be received in a slot 34 defined between spaced lugs or retaining blocks 35, 36, in which slot it is retained by a multipart piston and trunnion mechanism as described in U.S. Pat. No. 3,872,556. For this purpose, the tongue block 33 includes a shuttle trunnion 38, while the spaced retaining blocks 35, 36 include respectively a piston 39 and trunnion or slide bolt 40, slidably mounted therein. The shuttle trunnion 38 in the tongue block 33 is of the same length as the width of the block 33 so that, when the shuttle trunnion 38 is housed or enclosed within the block 33, the block 33 can be inserted into or removed from the slot 34 between the retaining blocks 35, 36. By retracting the piston 39 and sliding the trunnion segments 38 and 40 laterally, to the left as shown in the drawings, the shuttle trunnion 38 extends partially into the left-hand block 35 and the trunnion 40 extends partially into the tongue block 33 so that the block 33 is securely locked between the retaining blocks 35, 36, by the trunnion segments. To release the tongue block 33, hot or cold gas is applied to the piston end of the trunnion mechanism through a conduit 37 and fitting 41. The trunnion segments 38, 40 are pushed by the piston 39 and slide laterally until the piston and trunnion segments are aligned with the dividing surfaces of the retaining blocks 35, 36 and the tongue block 33, at which point the tongue block 33 separates from the retaining blocks 35, 36, as described in U.S. Pat. No. 3,872,556.

Figure 5:
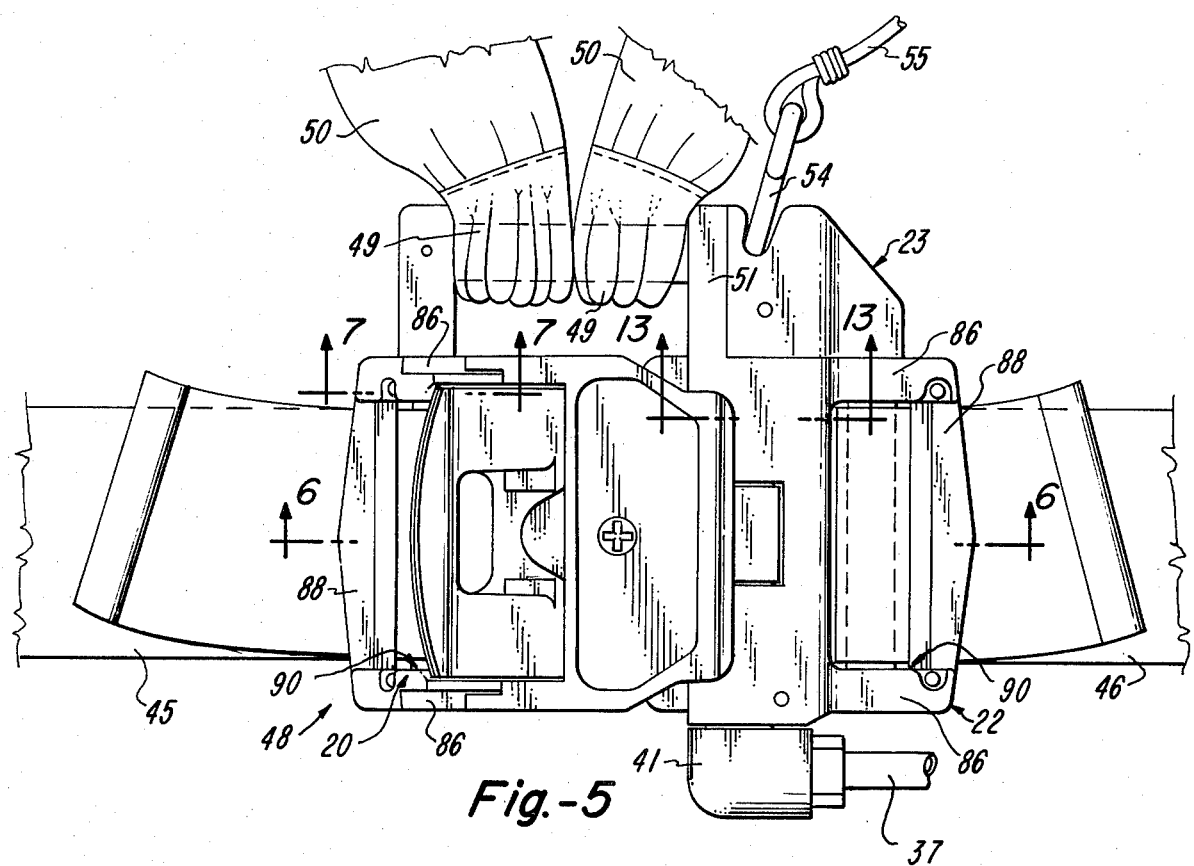
FIG. 5 is a top plan view of the releasable fastener shown in FIG. 1 assembled with lap belt straps, shoulder harness straps, ripcord key and attached lanyard, and pressure/power conduit.
Figure 6:
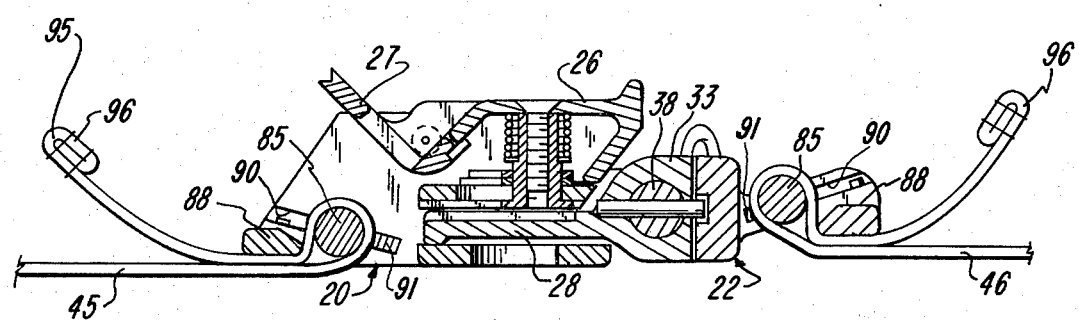
FIG. 6 is a section view taken substantially in the plane of line 6—6 on FIG. 5.

Lap belts 45, 46 are secured to the release assembly 20 and link assembly 22, respectively, as shown in FIG. 5, by appropriate webbing adjustment mechanisms 48. A preferred form of adjustment mechanism 48 is described in more detail below. To attach the torso restraint or shoulder harness straps 50, referred to herein as shoulder straps for convenience, to the release assembly 20, looped ends 49 of the shoulder straps 50 are slipped over the shoulder strap bar 21 and are retained thereon by an abutment formed as a laterally extending support plate 51 integral with the tongue member 22. The plate 51 is formed with an aperture 52 therethrough for receiving and retaining the free end of the shoulder strap bar 21. The parallel connection of the shoulder straps 50 and the lap belts 45, 46, provides a unique fastener which is light in weight and compact. It will be further appreciated that the alignment characteristics of the release and link assemblies as described in U.S. Pat. No. 3,986,234 facilitate insertion of the shoulder strap bar 21 into the receiving aperture 52 in the support plate 51 substantially automatically and without the necessity of carefully aligning the mating parts. Again, this facilitates the coupling operation since the self-aligning and releasable interlocking characteristics of the release and link assemblies enable the crewman to perform a series of coupling operations involving a number of elements to be coupled.

Figure 13:
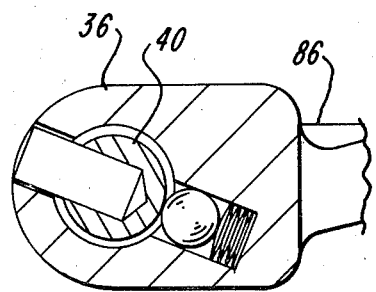
FIG. 13 is a section view taken substantially in the plane of line 13—13 on FIG. 5 and showing a detent on the quick disconnect mechanism.

For purposes of receiving and retaining a ripcord key terminal 54 secured on the free end of a parachute ripcord lanyard 55, and for interlocking the key 54 with the fastener mechanism, the ripcord key interlock mechanism 23 is mounted on link assembly 22 for cooperative interaction with both the release assembly 20, by means of coaction with the shoulder strap bar 21, and the quick disconnect mechanism 32, by means of coaction with the trunnion segment 40. To this end, the lateral mounting plate 51 supports the ripcord key interlock mechanism 23 in juxtaposition with both one end of the slide block or trunnion segment 40 and the aperture 52 which receives an inserted end of the shoulder strap bar 21. The slide block or trunnion segment 40 is slidably positioned within the right-hand retaining block 36, from which the mounting plate 51 extends, and the trunnion segment 40 includes a tip or pin 56, which extends into the ripcord key interlock mechanism for engagement therewith when the quick disconnect mechanism 32 is actuated, to prevent release of the key 54. A ball detent 58 (FIG. 13) is provided in the retaining block 36 for releasably holding the trunnion segment 40, and thereby the shuttle trunnion 38, in position for locking the insert block 33 in place. A shear pin (not shown) may also be utilized.

The ripcord key interlock mechanism 23 receives and releasably holds the inserted ripcord key 54 with a force sufficient to hold the key in place but not so strong as to preclude withdrawal of the key. In this manner, prior to the engagement of the release assembly 20 with the link assembly 22, the ripcord key can be manually pulled out of the interlock 23 against the resisting force of the toggle. This provides a fail-safe feature, and further frees the crewman's hands to complete the coupling of the release and link assemblies. Once the release and link assemblies have been coupled, however, the ripcord key 54 is securely retained in place. When the release and link assemblies are manually separated, such as described in U.S. Pat. No. 3,986,234, the ripcord key 54 is automatically ejected from the interlock 23. In the event of a power disconnect, such as described in Pat. No. 3,872,556, the ripcord key 54 remains securely locked into the interlock 23 and is thereby secured to the link assembly 22 and the seat belt to which it is attached. In the latter situation, the ripcord key 54 cannot be removed from the interlock 23 without resetting the shuttle trunnion disconnect mechanism.

The ripcord key interlock 23 accomplishes the foregoing functions through the mechanism of an overcenter toggle biased bell crank 60, pivotally mounted by a pivot pin 61, within an interlock housing 62 mounted on the plate 51 by appropriate screws 64. The bell crank 60 includes four distinct arms extending outwardly therefrom. A hook arm 65 extends radially outward from the bell crank 60 and then bends at an angle to form a hook. A generally rectangular interlock arm 66 is positioned about ninety degrees from the hook arm 65, and is adapted to extend into a slot 68 in the mounting plate 51. A locking arm 69 is positioned approximately diametrically opposite the hook 65, and is generally triangular in shape to define a locking surface 70 engageable with the locking pin 56 on the trunnion segment 40 when the quick disconnect mechanism is actuated. A toggle engaging pivot arm 71 is provided generally opposite the interlock arm 66 for engagement with a spring biased over-center toggle linkage 72.

The over-center toggle linkage 72 pivots within a well 74 located in one wall of the housing 62. The linkage includes a sleeve 75 pivotally mounted on the bell crank pivot arm 71, a pivot sleeve 76 with a hemispherical base 78 located in the bottom of the well 74, and a central guide pin 79. The sleeves 75, 76 are biased apart by a coil toggle spring 80 of sufficient strength to hold the bell crank 60 against rotation.

Figure 9:
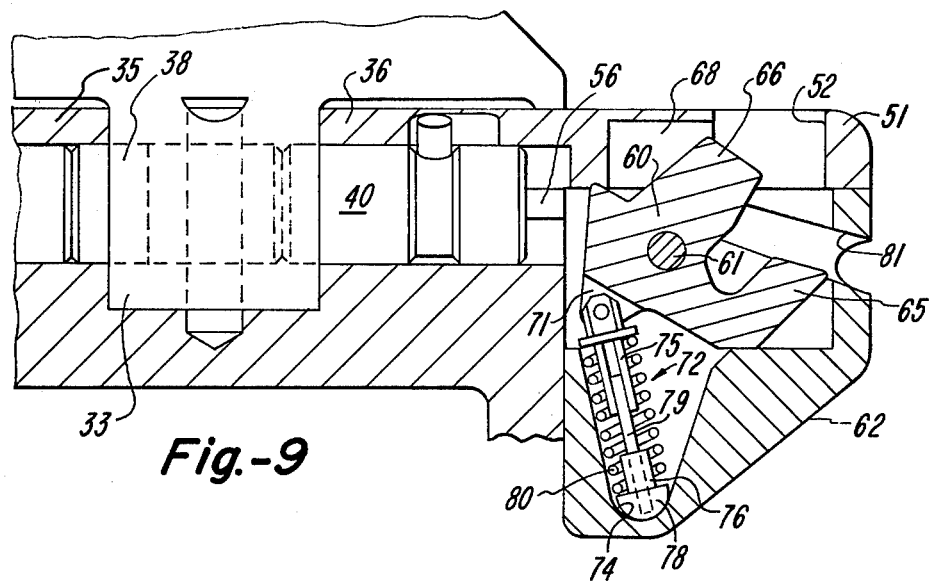
FIG. 9 is an enlarged partial top plan section view of the ripcord interlock and disconnect mechanism showing the components in normal uncoupled relationship prior to the insertion of the ripcord key.

To permit insertion of the ripcord key 54 into the interlock 23, the housing 62 is provided with an entrance slot 81 sized to receive the key 54, and extending from the side edge of the housing at an angle toward the support plate 51. The bell crank 60 is positioned in the housing 62 with the hook arm adjacent the slot 81 and with the hook positioned for engaging an aperture 82 in the inserted end of the ripcord key 54. Prior to insertion of the key 54, or after withdrawal thereof, as shown in FIG. 9, the interlock arm 66 of the ball crank 62 is interposed in the shoulder strap bar receiving aperture 52 in the plate 51 to prevent insertion of the shoulder strap bar 21. In this manner, the release and link assemblies, 20, 22 cannot be coupled in the absence of the ripcord key 54.

Figure 10:
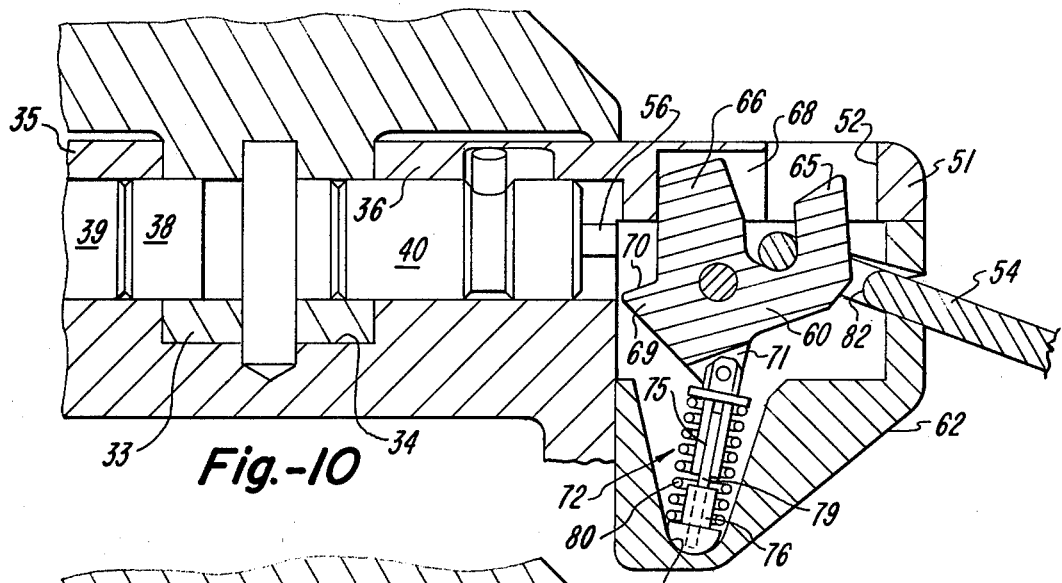
FIG. 10 is an enlarged partial top plan section view of the ripcord interlock and disconnect mechanism shown in FIG. 9 but with the ripcord key inserted into place preparatory to engagement of the link assembly with the release assembly.
Figure 11:
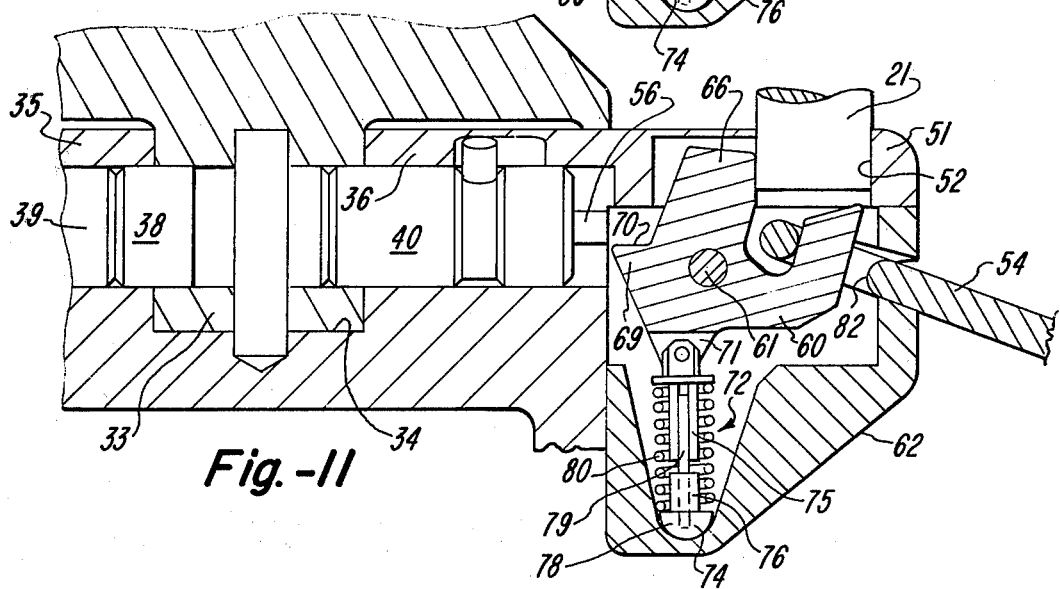
FIG. 11 is an enlarged partial top plan section view of the ripcord interlock and disconnect mechanism shown in FIG. 9 after the ripcord key has been inserted and the link assembly engaged with the release assembly.

When a crewman is seated in the ejection seat, and intends to fasten the lap belt and shoulder straps, the ripcord key 54 is first inserted into slot 81 in the interlock 23 in the link assembly 22. As shown in FIG. 10 the inserted key pivots the bell crank 60 against the over-center toggle 72 to cause the hook 65 to engage with aperture 82 of the key 54, and at the same time to swing the interlock arm 66 out of the shoulder strap bar hole 52. The toggle mechanism swings over-center to hold the bell crank 60 with the ripcord key 54 hooked thereon. At this point, the ripcord key 54 may be forcibly pulled out of the interlock, being held therein only by the force of the toggle spring 80. With the key 54 in place, the release and link assemblies can be engaged by inserting the tongue 28 into the buckle or release slot 30 and the shoulder strap bar 21, to which the shoulder straps have been engaged, into the mating aperture 52 in the plate 51 of the link assembly 22. The inserted end of the bar 21 engates the end of the bell crank hook 65 and partially swings the bell crank back towards its key release position, as shown in FIG. 11. The bell crank is prevented from fully rotating and releasing the key by the engagement of the interlock arm 66 thereon with the side of the inserted end of the bar 21. The spring biased toggle mechanism is, however, held over-center so that if the release and link assemblies are manually separated, thereby removing the bar 21 from the aperture 52, the ripcord key 54 is automatically and positively ejected with a snap-like action.

Figure 12:
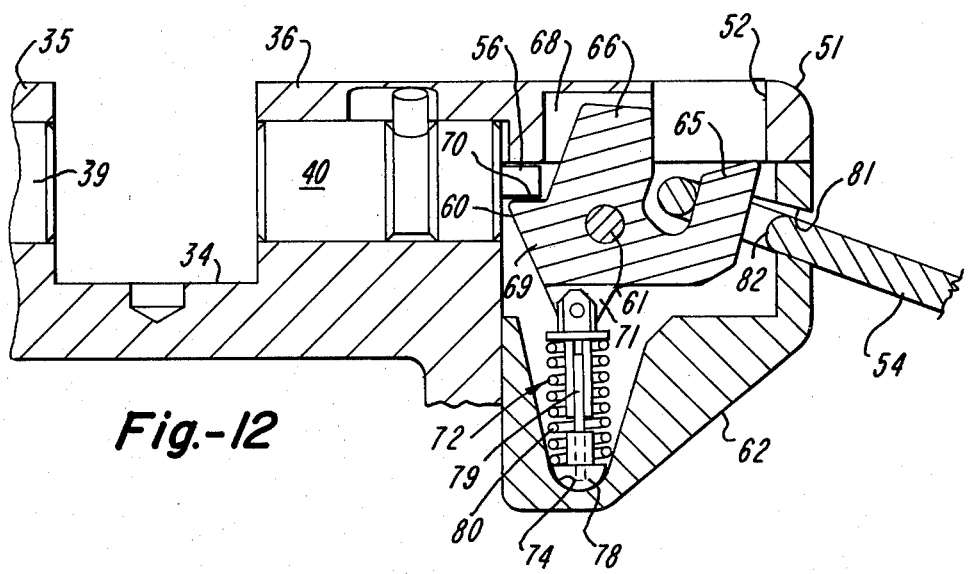
FIG. 12 is an enlarged partial top plan section view of the ripcord interlock and disconnect mechanism shown in FIG. 9 after automatic disconnect and with the ripcord key locked into place.

In the event of a powered disconnect, by the application of gas to the shuttle trunnion disconnect mechanism, such as in the case of an emergency ejection of the ejection seat from the aircraft, the locking pin 56 on the shuttle trunnion segment 40 projects into the path of the locking arm 69 on the bell crank to engage the locking surface 70 and thereby prevent the bell crank from rotating to release the key 54, as shown in FIG. 12. This effectively locks the ripcord key 54 to the link assembly 22 and its affixed lap belt 46. The belt 46, being secured to the ejection seat (not shown), serves to pull the ripcord or actuate the parachute deployment mechanism as the seat falls away from the crewman. It will be appreciated that once the powered disconnect mechanism has been actuated, the ripcord key 54 cannot be released, nor can the tongue block sections be reunited except by shifting and resetting the position of the shuttle trunnion disconnect mechanism.

Figure 7:
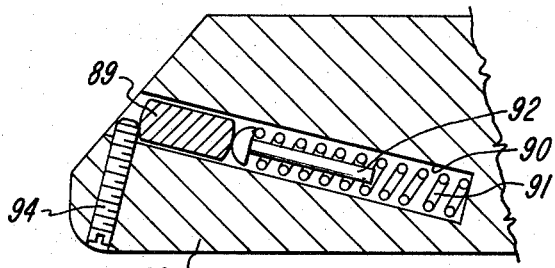
FIG. 7 is an enlarged section view taken substantially in the plane of line 7—7 on FIG. 5 and detailing the spring loading of the strap retaining bar.
Figure 8:
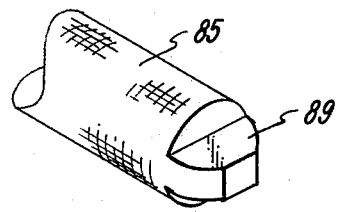
FIG. 8 is a partial perspective view of one end of a knurled strap adjustment bar forming a part of the fastener shown in FIG. 1.

The lap belts are secured to the buckle member 20 and tongue member 22 by a webbing adjustment mechanism 48. An improved adjustment mechanism is shown in the drawings and is formed by a non-rotatable clamping bar 85, which may be serrated or knurled, slidably mounted between spaced-apart parallel arms 86 extending from the buckle or release assembly and the tongue or link assembly. The outer ends of the arms 86 are joined at their bottom edges by a cross-arm 88 which may also be serrated on knurled positioned below the plane of the arms 86 and knurled bar 85. The knurled bar 85 is provided with a diametrical rib 89 on each end, which ribs are slidably positioned in corresponding grooves 90 in the adjacent faces of the arms 86. The knurled bar 85 is biased toward the cross-arm 88 by springs 91 and plungers 92 in the grooves 90, which act against each inserted rib 89, as shown in FIG. 7. The ribs 89 are chamfered in order to keep the plungers adjacent the inner wall of the groove 90. The knurled bar 85 is retained in the grooves 90 by stop or set screws 94. In this manner, the knurled bar is urged toward the cross-arm 88 so that webbing trained around the knurled bar 85 is pinched against the cross-arm 88. The tightness of the grip between the cross-arm 88 and knurled bar 85 is increased as the webbing is placed under tension. By rotating the buckle engaging end of the assembly downwardly relative to the plane of the webbing to space the webbing from the cross bar 88, the grip on the webbing is released and the webbing can be readily loosened. The belts can then be tightened simply by pulling on the free ends 95, 96 of the belt 45, 46 which extend from the adjustment mechanism. The webbing gripping and adjustment mechanism 48 is thus simple to adjust and yet is highly effective in preventing slippage or release of webbing such as lap belts and the like.

While a preferred embodiment of the present invention has been shown in the drawings and described above in detail, it should be understood that there is no intention to limit the invention to the specific form disclosed. On the contrary, the intention is to include all modified forms, alternative constructions, equivalents and uses of the invention falling within the spirit and scope of the invention as expressed in the appended claims.

We claim as our invention:

1. A releasable fastener for use with an aircraft ejection seat for joining a pair of lap belts, shoulder straps and a key connected to a parachute ripcord, comprising, in combination a manually actuated release assembly secured to one lap belt, means on said release member for releasably engaging the shoulder straps, a link assembly secured to the other lap belt, means on said link assembly for releasably engaging the parachute ripcord key, said release assembly and said link assembly being interengageable by the insertion of said link assembly into latching engagement with said release assembly, and means operatively engaging said ripcord key engaging means when said release assembly and said link assembly are interengaged for precluding withdrawal of said ripcord key.

2. A releasable fastener as defined in claim 1 wherein said means for releasably engaging said ripcord key comprises a four-armed bell crank, an overcenter toggle linkage connected to one arm of said bell crank for biasing said bell crank to either of two extreme positions, said bell crank including a hook arm for engaging said ripcord key, a stop arm for engaging an inserted end of the shoulder strap bar for preventing withdrawal of the ripcord key, and a lock arm engageable with a stop member on the quick disconnect mechanism.

3. A releasable fastener as defined in claim 2 wherein said over-center toggle biased bell crank releasably holds said key in a manner permitting withdrawal of said key before said release assembly and said link assembly are engaged while precluding interengagement of said release assembly and said link assembly unless said key is inserted in place.

4. A releasable fastener for use with an aircraft ejection seat for joining a pair of lap belts, shoulder straps and a key connected to a parachute ripcord, comprising, in combination a manually actuated release assembly secured to one lap belt, means on said release assembly for releaseably engaging the shoulder strap, a link assembly secured to the other lap belt, means on said link assembly for releasably enagaging the parachute ripcord key, said release assembly and said link assembly being interengageable by the insertion of said link assembly into latching engagement with said release assembly, said ripcord key engaging means being engaged by said shoulder strap engaging means to preclude withdrawal of said ripcord key when said release assembly and said link assembly are interengaged.

5. A releasable fastener for use with an aircraft ejection seat for releasably joining a pair of lap belts, shoulder straps and a key connected to a parachute ripcord, comprising, in combination, a manually actuable release assembly secured to one lap belt and having means thereon for releasably engaging said shoulder straps, a link assembly secured to the other lap belt and engageable with said release assembly for coupling said lap belts and shoulder straps, means on said link assembly for powerably disconnecting the link assembly to release said shoulder straps and separate said laps belts, means on said link assembly for releasably engaging said ripcord key, and means on said disconnecting means engageable with said ripcord key engaging means for locking said ripcord key engaging means to prevent withdrawal of said key upon the powered disconnection of the link assembly from the release assembly to release the shoulder straps and separate the lap belts.

6. A releasable fastener for use with an aircraft ejection seat for releasably joining lap belts, shoulder straps and a key connected to a parachute ripcord, comprising, in combination, a manually actuable release assembly secured to one lap belt and having means thereon for receiving looped ends of shoulder straps, a link assembly secured to another lap belt and engageable with said release assembly for coupling said lap belts and shoulder straps, means on said link assembly for powerably disconnecting the link assembly to release said shoulder straps and separate said lap belts, means on said link assembly for releasably engaging said ripcord key, said ripcord key engaging means including means for precluding the coupling of said release assembly and said link assembly in the absence of an engaged ripcord key, and means on said disconnecting means engageable with said ripcord key engaging means for locking said ripcord key engaging means to prevent withdrawal of said key upon the powered disconnection of the link assembly from the release assembly to release the shoulder straps and separate the lap belts.

7. A releasable fastener for use with an aircraft ejection seat for releasably joining a pair of lap belts, shoulder straps and a key connected to a parachute ripcord, comprising in combination, a manually actuable release assembly secured to one lap belt, means on said release assembly for releasably engaging the shoulder straps, a link assembly secured to the other lap belt, said release assembly and said link assembly being interengageable in manually disconnectable engagement, means on said link assembly for powerably disconnecting said release and link assemblies, means on said link assembly for releasably engaging the parachute ripcord key, means operatively engaging said ripcord key engaging means when said release assembly and said link assembly are interengaged for precluding withdrawal of said ripcord key, and means for engaging said ripcord key engaging means to lock said ripcord key to one of said assemblies when said powered disconnecting means is actuated to disconnect said release assembly and said link assembly to separate said lap belts and release said shoulder straps.

8. A releasable fastener for use with an aircraft ejection seat for releasably joining a pair of lap belts, shoulder straps and a key connected to a parachute ripcord, comprising, in combination, a manually actuable release assembly secured to one lap belt, means on said release assembly for releasably engaging the shoulder straps, a link assembly secured to the other lap belt, said release assembly and said link assembly being interengageable in manually disconnectable engagement, said ripcord key engaging means including means for precluding interengagement of said release assembly and said link assembly when said ripcord key is not engaged, said ripcord key engaging means including means for positively ejecting said ripcord key when said release assembly and said link assembly are disengaged by manual actuation of said release assembly, means operatively engaging said ripcord key engaging means when said release assembly and said link assembly are interengaged for precluding withdrawal of said ripcord key, and means for engaging said ripcord key engaging means to lock said ripcord key to one of said members when said powered disconnect means is actuated to disconnect said release assembly and said link assembly to separate said lap belts and release said shoulder straps.

9. A releasable fastener for use with an aircraft ejection seat for releasably joining a pair of lap belts, shoulder straps and a parachute ripcord having a ripcord key connected thereto, comprising, in combination, a manually actuated release assembly, means on said release assembly for adjustably securing said release assembly to one lap belt, means on said release assembly for releasably engaging said shoulder straps, a link assembly, said link assembly and said release assembly being interengageable in manually disconnectable engagement, means on said link assembly for adjustably securing said link assembly to the other lap belt, means on said link assembly for releasably engaging the ripcord key, and means operative in response to the interengagement of said release assembly and said link assembly for blocking withdrawal of said ripcord key, said adjustable securing means comprising a pair of spaced parallel arms extending from an assembly, a cross-arm joining said arms at the outer ends thereof, and a clamping bar slidably mounted between said arms and spring biased toward said cross-arm for gripping a belt webbing trained around said bar and having a free end extending between said bar and said cross-arm.

10. In a releasable fastener for use with a flexible strap, a mechanism for adjustably securing said strap to a fastener member comprising a pair of spaced-apart parallel arms extending from said fastener member and each having a longitudinal channel defined therein, a cross-arm extending between and joining said arms adjacent the outer ends thereof, a clamping bar slidably mounted between said arms and having ends slidably engaged in said channels, and a compression spring in each channel operatively engaged with said clamping bar ends for biasing said bar toward said cross-arm into close juxtaposition therewith for gripping engagement with a strap trained around said bar and having a free end extending between said bar and said cross-arm.

11. In a releasable fastener for use with a flexible strap, a mechanism for adjustably securing said strap to said fastener comprising a pair of spaced-apart parallel arms extending from said fastener, a cross-arm extending between said arms in a plane below the plane of said arms and joining said arms at the bottom of the outer ends thereof, a clamping bar slidably mounted between said arms, means defining an elongated groove in the opposed faces of said arms, diametrically extending rib on each end of said bar slidably received in a corresponding groove, and a compression spring in each groove operatively engaging said ribs for biasing said bar toward said cross-arm into close juxtaposition therewith for gripping engagement with a strap trained around said bar and having a free end extending between said bar and said cross-arm.

12. A releasable fastener as defined in claim 11 including removable stop means in said grooves adjacent said cross-arm for preventing inadvertent escape of said clamping bar beyond said cross-arm.

13. A releasable fastener as defined in claim 12 wherein the outer ends of said diametrically extending ribs are chamfered and said fastener includes a plunger at the end of each compression spring engaging said chamfered rib, whereby said chamfered ribs direct said plungers outwardly into engagement with the inner wall of the elongated groove.

* * * * *